United States Patent [19]

Nelson

[11] Patent Number: 4,888,729
[45] Date of Patent: Dec. 19, 1989

[54] DIGITALLY CONTROLLED OSCILLATOR APPARATUS

[75] Inventor: Blaine J. Nelson, Plano, Tex.

[73] Assignee: Rockwell International Corporation, El Segundo, Calif.

[21] Appl. No.: 190,915

[22] Filed: May 6, 1988

[51] Int. Cl.[4] .............................................. G06F 1/04
[52] U.S. Cl. .............................. 364/900; 364/934.71; 364/947; 375/118
[58] Field of Search ..................... 364/900 MS File; 375/118; 331/1 A, 1 R

[56] References Cited

U.S. PATENT DOCUMENTS

| 4,241,418 | 12/1980 | Stanley | 364/900 |
| 4,257,108 | 3/1981 | Igel | 364/900 |
| 4,431,969 | 2/1984 | Summers et al. | 375/118 X |
| 4,656,649 | 4/1987 | Takahashi | 375/118 X |
| 4,680,621 | 7/1987 | Baker et al. | 375/118 X |

Primary Examiner—Thomas M. Heckler
Attorney, Agent, or Firm—Bruce C. Lutz; V. Lawrence Sewell; H. Fredrick Hamann

[57] ABSTRACT

A variable frequency oscillator which is completely digital and does not use high frequency parts higher than 50 megahertz and yet operates at 50 MHz. Variable frequency is obtained by increment and decrement inputs supplied to a control block which selects between selected phase holding signal inputs obtained from an external source. The output pulse is returned to the control mechanism to start the cycle over. Internal to the control is an algorithm or control sequence which uses a make-before-break approach to prevent glitches which tend to occur during change of phase.

4 Claims, 5 Drawing Sheets

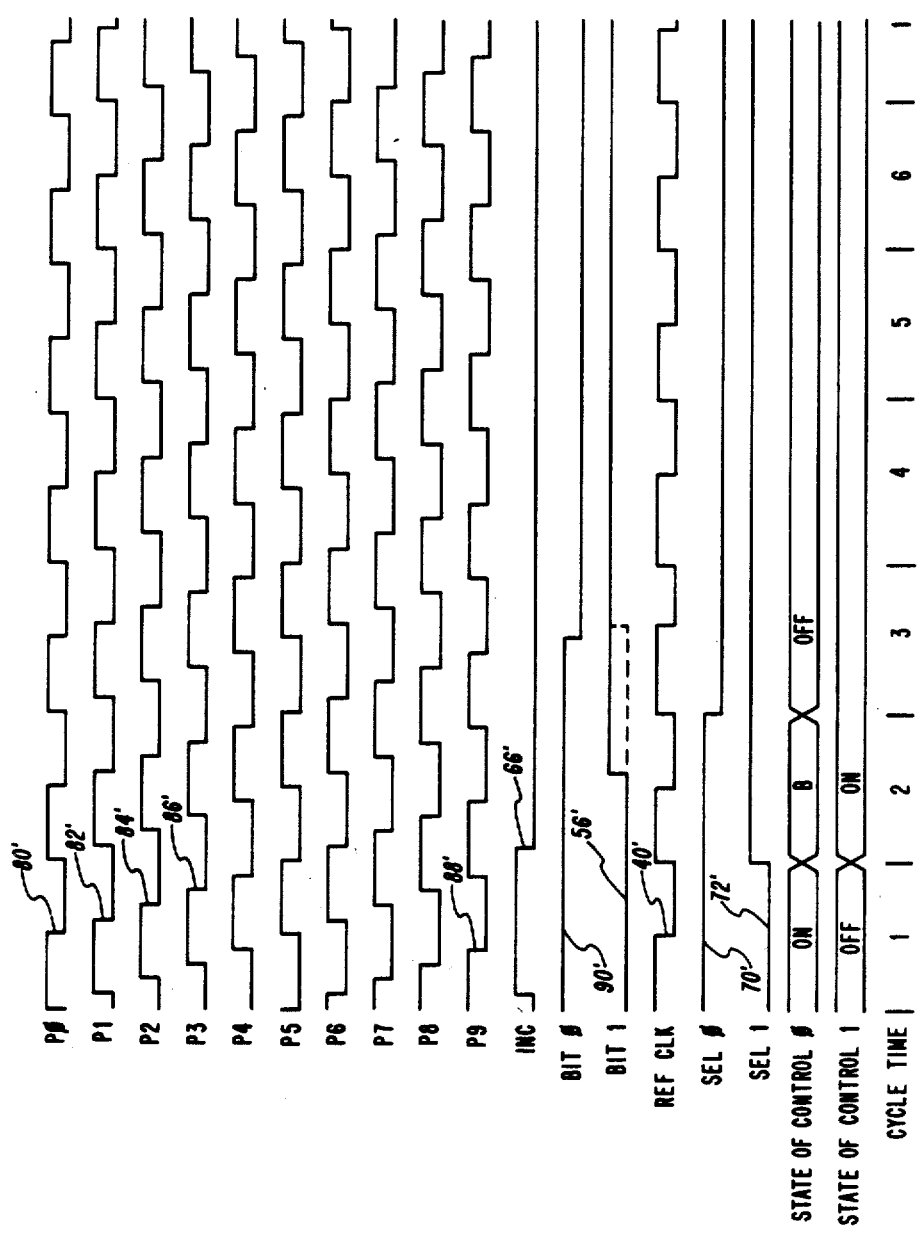

DIGITALLY CONTROLLED OSCILLATOR APPARATUS

THE INVENTION

The present invention is generally related to electronics and more specifically related to controlled oscillators. Even more specifically, it's related to an oscillator incorporating digital techniques throughout which includes provisions for preventing glitches (inappropriate rising edge signal transitions) upon change of phase pursuant to the frequency control process.

BACKGROUND

Controlled oscillators, and in particular, analog controlled oscillators, have been in existence for many years. The general function of a controllable oscillator is to provide an output frequency which is related in some manner to a control input signal.

In an analog oscillator, the output frequency is generally controlled in accordance with an input voltage although at times it is controlled according to a current. In general, however, analog controllable oscillators have an output frequency which is a function of the gain of the oscillator and of the control voltage input.

In a digitally controlled oscillator such as presently described, the relationship between the output frequency and the control signal is quite different. The output frequency is generated by adding positive or negative increments of phase to the base reference frequency. The number of these increments added to the base reference rate per unit of time is a direct indication of the frequency output by the oscillator.

As is well-known, analog controlled oscillators are often affected by temperature and other environmental factors and in addition, often dissipate large amounts of power as heat. Since the present design is all digital, thus allowing it to be implemented in CMOS or other low power technologies, the generation of heat is minimized and the frequency control problems due to environmental conditions are non-existent.

It is thus an object of the present invention to provide an improved controlled oscillator apparatus.

Other objects and advantages of the present invention will be apparent from a reading of the specification and appended claims in conjunction with the drawings wherein;

FIG. 1 is a block diagram of the overall controlled oscillator inventive concept;

FIGS. 2a–e comprise a set of waveforms illustrating how discontinuities can occur in the output signal if the manner of generation of the output signal is not carefully analyzed;

FIGS. 5a–s comprises a set of waveforms used in explaining FIGS. 1 and 3.

DETAILED DESCRIPTION

Figure 1:
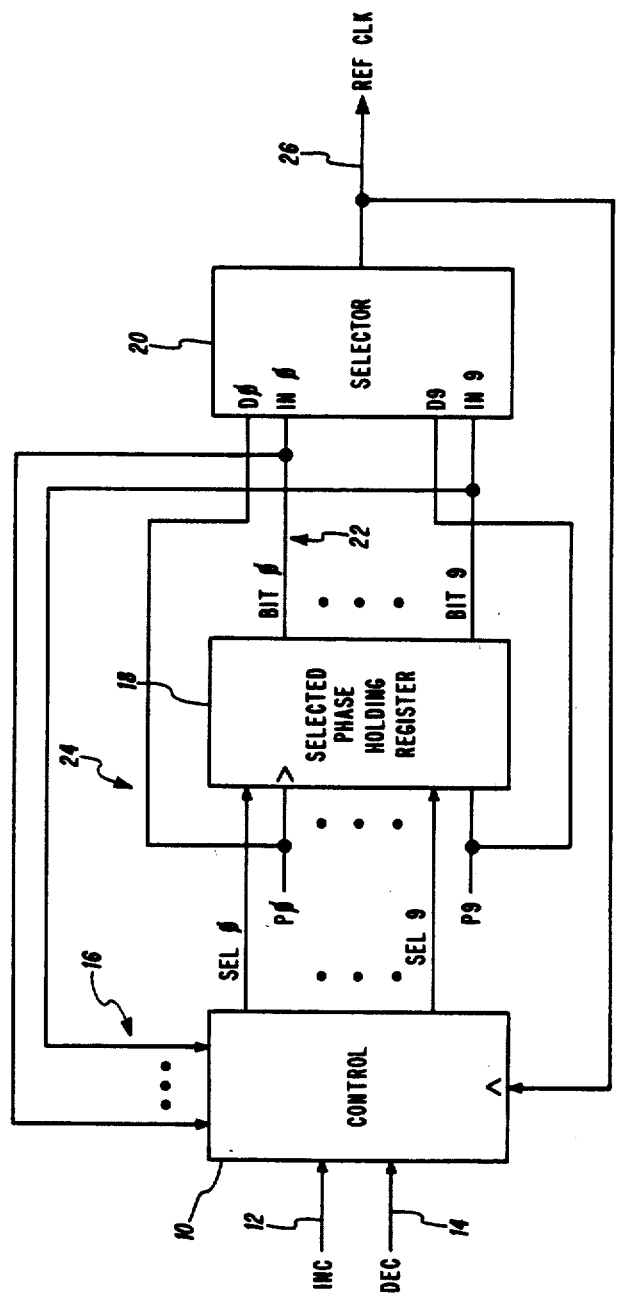

In FIG. 1 a control block 10 has increment and decrement inputs 12 and 14, respectively, as well as a set of select inputs generally designated as 16. The select inputs range from select 0 to select 9. These inputs 16 are derived from the B outputs of a select phase holding register block 18 and are labeled at the output of block 18 as Bit 0 through 9 supplied to Inputs 0 through 9 for selector block 20. The P0 through P9 leads input to block 18 ar also input to inputs D0 through D9 of selector block 20. The set of leads Bit 0 through Bit 9 will be generally designated as 22 whereas the set of leads P0 through P9 which are input to blocks 18 and 20 will be generally designated as 24. An output from selector block 20 provides a reference clock signal on a lead designated as 26 and the signals on lead 26 are also supplied to an input of control block 10 in a feedback fashion.

Figure 2:
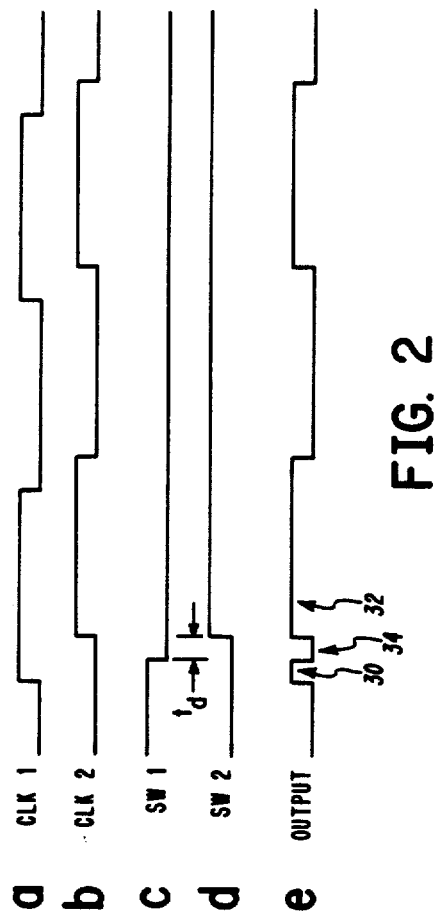

In FIG. 2 the waveforms show a first clock signal in waveform FIG. 2a labeled CLK 1. This clock may be representative of phase P4 in FIG. 5. FIG. 2b illustrates a second clocking signal clock 2 which may be representative of waveform P5 in FIG. 5. The waveform of FIG. 2c is labeled SW1 for switch 1 and may be deemed equivalent to Bit 4 as output from the selected phase holding register of FIG. 1 whereas the waveform of FIG. 2d labeled switch 2 would be indicative of the inverted version of the waveform of FIG. 2c with the delay being due to the inherent delay occurring from passing through the inverting circuitry. The waveform of FIG. 2d shows a time delay $t_d$ which is the delay introduced by the inverting circuitry. A final waveform of FIG. 2 is an output signal labeled "output" and being representative of a signal which might appear on output 26 of FIG. 1 if the algorithm used in the present invention were not such that there is a make-before-break to prevent the disruption (insertion of extraneous logic level transitions) of the output signal as illustrated in the waveform of FIG. 2e. As shown, in FIG. 2e a first positive portion is labeled 30, a second positive portion is shown as 32 and a negative portion equivalent in length to time $t_d$ is shown as 34.

Figure 3:
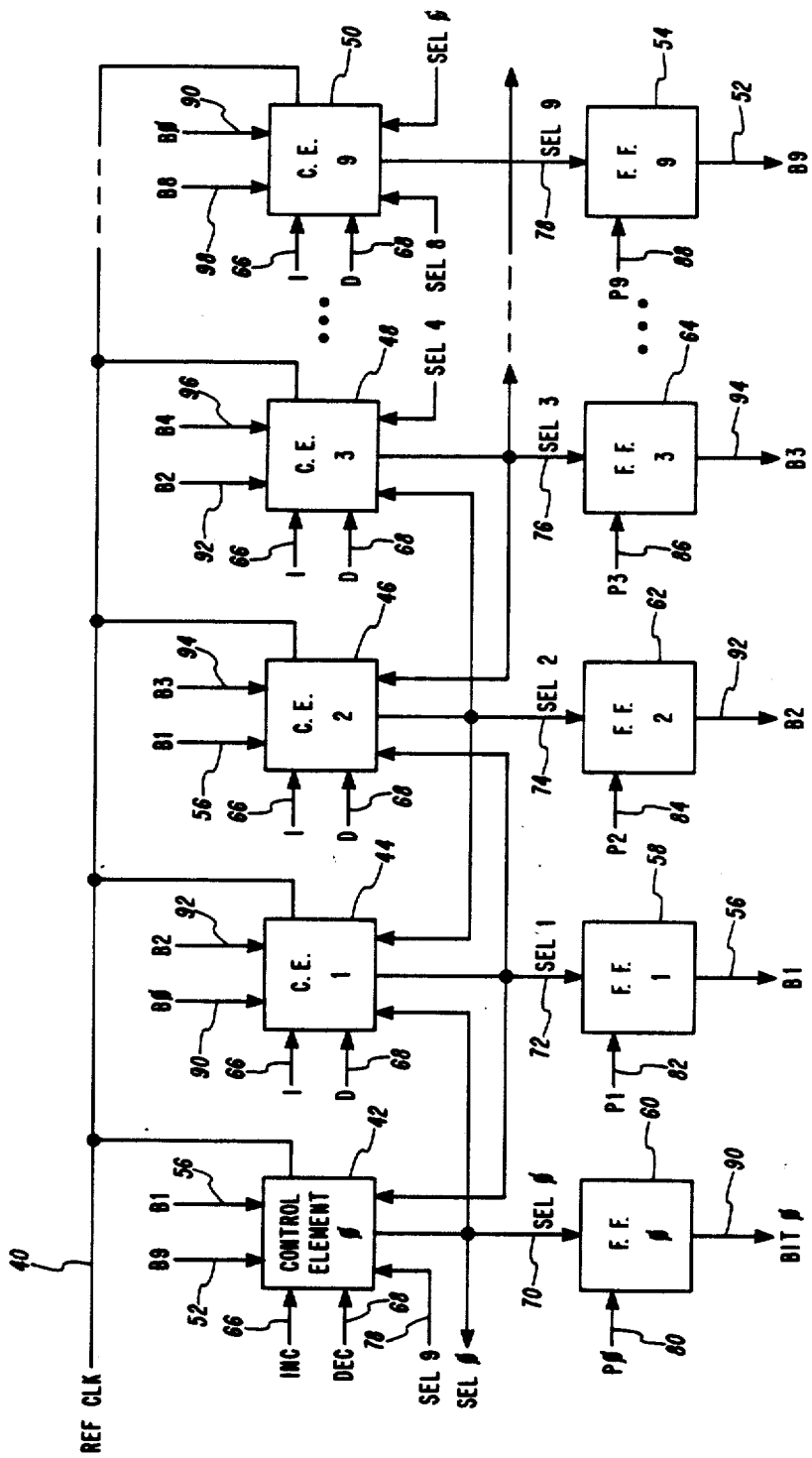
FIG. 3 is a block diagram illustrating in more detail portions of FIG. 1.

In FIG. 3 a reference clock lead 40 which may be considered equivalent to 26 of FIG. 1 is supplied to each of the control element blocks 42, 44, 46, 48 and 50. The blocks illustrate the fact that in one embodiment of the invention there are ten control elements from control element 0 to control element 9. In essence, these control elements are connected in a ring type configuration wherein each control element receives a bit input from a flip-flop output corresponding to an adjacent control element. As illustrated, control element 42 receives a Bit 9 input on a lead 52 which is the same designation as provided from the output of a flip-flip 9 designated as 54. The control element 42 receives a second input on a lead 56 corresponding to a similar output from flip-flop 1 designated as 58. The remaining flip-flops are designated as 60, 62, and 64 and are respectively labeled as flip-flop 0, flip-flop 2 and flip-flop 3. Each of the control elements illustrated have an increment input designated as 66 and a decrement input designated as 68. The control elements illustrated each have a select line output each of which select lines are designated as shown from output 70 which is further designated as select line 0 since it is obtained from control element 0 to the remaining select lines 72, 74, 76 and 78 corresponding respectively to the other control elements illustrated. Each of the flip-flops has a phase input on a lead such as P0 on lead 80. The remaining phase inputs are labeled 82, 84, 86 and 88 as shown. The flip-flops provide an output from Bit 0 to Bit 9 also designated as shown with two of these bit outputs being previously labeled. The Bit inputs B4 and B8 are obtained from control elements not shown but are given designations of 96 and 98.

These are supplied respectively to control elements 3 and 9.

Figure 4:
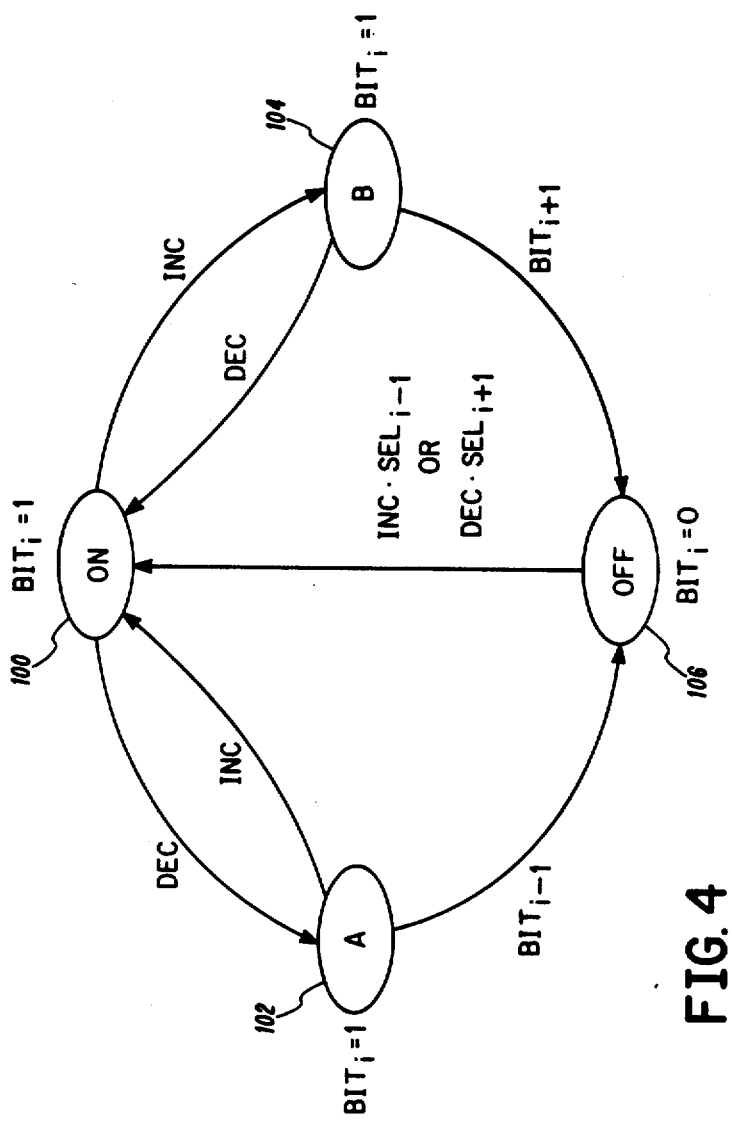
FIG. 4 is a state diagram used for explaining the algorithm used by a portion of the blocks in FIGS. 1 and 3 in changing states in response to input signals.

In FIG. 4 a state diagram is shown where the state designated as 100 illustrates an ON condition and the control element can proceed either to state 102 which is labeled A or 104 which is labeled B depending upon whether it receives a decrement or increment signal. The states A and B are holding states to make sure that the phase alteration is actually completed. If the device proceeds to state A and then receives an increment signal before it receives a bit input from the previous control element section of the system, it will return to the ON state of 100 and the phase change will not be completed. A similar but reverse set of circumstances occurs if it is in state B. However, if the appropriate adjacent control element is activated so that the present control element receives the bit signal from the adjacent control element, it will proceed to the OFF state designated as 106. The way it returns to state 100 is to receive an increment or decrement signal and the select signal from the appropriate adjacent control element.

In FIG. 5 the waveforms a through d and j through p have been given the same designations as utilized in the circuit diagram of FIG. 3 with the addition of a prime (') to ease the discussion and the ability of the reader to relate the waveforms to the diagram. The waveforms q and r of FIG. 5 illustrate the state of the control elements 42 and 44 of Figure while the waveform s is merely representative of the time. Each section of waveforms constitutes one complete cycle of a reference such as the REF CLK waveform of FIG. 5n.

OPERATION

Before commencing the discussion of operation of this invention, it is necessary to realize that a remote signal source establishes the base frequency of the oscillator at which the oscillator will operate without any increment or decrement signals. This reference or base signal source supplies the phase shifted signals of P0 through P9 as part of its signal supplying function. Thus, if the present oscillator is to operate at an offset of 1% either above or below the reference frequency, a supply of increment or decrement signals equal in number to 1% of the base frequency times the number of phase increments must be supplied on a continuous basis to maintain such an offset.

The design of the present invention is such that it requires six complete cycles of the base signal supply frequency to complete an increment operation. Thus, the present invention is limited to a frequency deviation of about 1.6% (1/(6×10)) of the base supply frequency.

In one embodiment of the present invention, the base frequency was 50 megahertz and the oscillator was not allowed to deviate more than 230 kilohertz on either side of the base frequency due to limitations of other circuit constraints. Thus, it is believed that the controllable deviation capability of the present invention far exceeded that allowable by the system constraints.

It also will be realized by those skilled in the art that the output from an oscillator in a digital circuitry is typically used for various synchronizing functions by many other components in the system. For this reason, the switching between phases must be accomplished in such a way that extra pulses are not inserted in the output data stream since the synchronizing typically operates with respect to each occurrence of a rising or leading edge of a pulse.

As illustrated in FIG. 2, a typical prior art approach would be to have a switching system which is attempting to switch from the use of clock 1 to the use of clock 2 to be provided to the output. The switch 1 signal of FIG. 2c has been ON so that clock 1 is routed to the output. This is shown by the first pulse in waveform e of FIG. 2 where a rise is shown. However, it may be assumed that an increment pulse is received such that it is desired to use clock 2. Since the clock 2 is occurring later than clock 1, this would normally be a process where the output frequency is intended to be decremented. Thus, the switch 1 signal falls to a logic 0. Due to time delay of the circuitry involved, the switch 2 activating signal will not occur for time delay represented as $t_d$. Thus, when the switch 2 signal is activated to a logic 1, the clock 2 signal can then be passed to the output. The switch 2 signal is left in an active condition as long as clock 2 is to be passed to the output. However, instead of decrementing the output signal as desired, an extra leading edge is introduced in the output waveform during the time that the two switching signals are both in a low logic condition. A part of the present inventive concept is to provide for a effect of activating the switch 2 signal before deactivating the switch 1 signal.

With the above statements in mind, reference will now be made to FIG. 1 where the output reference clock signal on lead 26 is returned to the set of control elements 10. During the time that no increment or decrement signals are received the reference clock is applied to all of the control elements simultaneously but the control elements do not respond in any way until a further increment or decrement signal is received. Thus, the control block 10 merely continues sending out a signal on one of the select lines of select 0 through select 9. The appropriate on of the select signals is utilized to select the appropriate corresponding phase signal from phase P0 to phase P9. This select signal keeps the flip-flop to which it is attached operating in accordance with the phase input and is transmitted to the output set of leads 22 of B0 through B9. In other words, the selected phase holding register 18 also maintains the status quo as long as no input is received from the increment and decrement lines 12 and 14. The selector 20 receives the inputs of B0 through B9 as well as the phase inputs of P0 through P9 and operates in a summing fashion to pass any phase input whose corresponding bit input is a logic 1. In other words, there is an output if both the bit input and the corresponding phase input are a logic 1 and all of these AND gates are OR'd to the output so that during an increment or decrement phase altering period, two sets of inputs can be supplied to the output 26.

When a phase altering signal such as a increment is applied to input 12, the state control logic within the control elements of block 10 operates to provide a signal on a select line adjacent to the control element that had been the only control element in an ON condition. In other words, on control element proceeds from state 106 to state 100 as illustrated in FIG. 4. As shown, it must be the control element adjacent the one that had been and still is ON. Thus, two adjacent select lines of FIG. 3 are activated. These select lines allow the passage of two phase signals simultaneously so that two adjacently located bit signals are output in the set of leads 22. The activation of the two bit signals from the selected phase register 18 produces a summing action within selector 20 to produce a non-symmetrical output pulse somewhere in the time frame between 1½ cycles and 2½ cycles after the increment pulse is initially received. The variation in delay is caused both by non-identical delays in the circuitry and whether the phase alteration is to increment or decrement. Regardless of when exactly this action occurs, the following cycle introduces further action within the control element block 10 to (1) change the previously ON control element to an OFF state from its holding state such as holding state 104 of FIG. 4 and (2) maintain the newly switched control element in its ON condition until a further increment or decrement signal is received.

It will be noted that the reference clock output has a longer duration for the first cycle after the new control element is activated and it is during this longer cycle that the old control element is deactivated. It is also during this time that the associated flip-flop in the selected phase holding register is deactivated so that for the remaining cycles of the six cycles it takes to complete an increment or decrement phase altering operation, there is only one control element active. This is shown in waveforms q and r of FIG. 5 which illustrate the state of the control elements 0 and 1 for time periods 1, 2 and 3 with these states continuing until a further phase altering signal is received.

The dash line shown in the Bit 1 waveform m is intended to illustrate that the occurrence of the change of level for the bit signal to be activated can occur over a range of approximately one cycle from approximately half way through the second time period to approximately half way through the third time period depending partly on the internal delays but primarily as to whether it is an increment or decrement signal. A delay in the Bit 1 signal will show up in a corresponding change in delay of deactivation of the select 0 signal and the deactivation of its associated Bit 0 signal. The nonsymmetry in the reference clock output would also change accordingly during the third and fourth time periods.

As indicated previously, the control elements are essentially connected in a ring configuration since one of the select inputs to control element 0 is the output of control element 9 and likewise one of the bit inputs for control element 9 comprises the bit output of flip-flop 0 associated with control element 0. As also indicated previously, the occurrence of a phase altering increment or decrement signal always affects the control element adjacent the presently active control element and is on the left for one of the increment and decrement signals and is on the right for the other one.

Although further detailed explanation is probably unnecessary for those skilled in the art, a quick run through will be provided for completeness of disclosure. It may be assumed, as shown in FIG. 5, that control element 0 is presently in an ON state and the remaining control elements are OFF. Thus, there is a logic 1 output on lead 90 from flip-flop 60 as is shown to be the case in FIG. 5 for waveform 1. It may be further assumed that an increment signal is applied on lead 66 to each of the control elements from 0 through 9. This increment signal lasts only one time period or one cycle of the output signal as is shown in waveform k of FIG. 5. This increment signal causes control element 0 or block 42 to advance to state B as shown in FIG. 4. Block 44 containing control element 1 is changed from an OFF condition to an ON condition since the state diagram illustrates that the occurrence of an increment signal and a select signal having a positive value from an adjacent control element will effect such a change. Reference to FIG. 5 waveform m will illustrate that the select 0 signal is in a logic 1 condition at the same time that the increment signal is a logic 1 thereby causing control element 1 to change to an ON condition. The select 1 signal on lead 72 is turned ON as shown in waveform p of FIG. 5 at the beginning of the next rising edge of the reference clock. While the select 1 will not be instantaneously a logic 1 due to an actual condition of delay through various control logic, it may be assumed for the purposes of this discussion to occur at the same time. The Bit 1 signal on lead 56 raises to a logic 1 upon the trailing edge of the phase 1 input signal on lead 82. Thus, at this time, the selector block 20 of FIG. 1 is receiving switching inputs on both the B0 and B1 leads so that the output reference clock commences at the commencement of the phase input P0 and does not return to a logic 0 until the end of the phase input P1. It may be noted from waveform 1 of FIG. 5 that the Bit 0 output falls to a logic 0 part way through time period 3 and in coincidence with the trailing edge of P0. The reason that the Bit 0 output falls to a logic 0 is that although there is a logic 1 input at the beginning of time period 3, in accordance with the logic 1 input from the select 0 signal, this is immediately changed due to the fact that the control circuitry within block 42 detects that it is in the B state and as soon as it receives the next rising edge input from the reference clock, in addition to having a B1 input as a logic 1, it will return to a logic 0 output condition and thus, is in the OFF state 106. For this reason, flip-flop 0 changes to a logic 0 output at the end of the phase 0 (cycle time 2) waveform a of FIG. 5.

As previously indicated, the oscillator was designed to wait six cycles before accepting a further increment signal due to other system considerations. Such a system consideration includes, in one embodiment of the invention, a compare hold register, comprising a part of a phase detector, being loaded during the fifth time period.

In summary, the present invention comprises a digitally controlled oscillator which is capable of operating at extremely high frequencies and which performs the transition in phase by small increments in accordance with a make-before-break algorithm such that the phase change is accomplished without the occurrence of deleterious extra rising edge pulses. The control is accomplished by selecting one of a plurality of selectable phase signals and summing adjacent phase signals for a single clock period subsequent to the occurrence of each phase altering increment or decrement signal to provide a composite output and then terminating the activating switch signal of the element previously controlling the selection process.

Although I have described a single embodiment of the inventive concept, I wish to be limited not by that specific embodiment of a digitally controlled and glitchless high speed oscillator, but wish to be limited only by the scope of the appended claims.

Wherein I claim:

1. Digital oscillator apparatus comprising, in combination:
   first means for supplying a set N of phase related first signals each of a given frequency;
   logic circuits comprising a set N of logic circuits, each of said logic circuits including phase and select signal inputs and a logic signal output the phase input of each one of said set N of second means being connected to said first means to receive a respective one of said set N of phase related signals of said first means, the appearance of a given logic value signal at said select input thereof being clocked to the logic output thereof as one of a set N of second signals upon the next occurrence of a given transition in the signal applied to said phase input thereof;

third means, connected to said first and second means to receive said sets N of first and second signals, said third means providing a digitally phase controlled output third signal comprising a composite of ones of said first signals having a corresponding second signal in a given logic condition;

fourth means for supplying increment and decrement phase altering fourth signals; and fifth means, connected to said second, third and fourth means to receive said second, third and fourth signals therefrom an comprising a set N of control elements connected in a ring configuration and only one of said set N of control elements being ON under normal non-phase altering conditions, for generating a set N of select fifth signals for application to said select inputs of said second means, the occurrence of a phase altering fourth signal activating another control element, adjacent to the control element presently in an ON condition, to an ON condition in accordance to whether the phase is to increment or decrement, the previously ON control element staying in an ON condition until receipt of a second signal of the given logic value confirms that the phase alteration has taken place in a MAKE BEFORE BREAK algorithm before the previously ON control element proceeds to an OFF condition.

2. The method of digitally controlling the phase output of an oscillator comprising the steps of:

clocking a set N of logic first signals with a set N of phase related second signals wherein a set N of third signals is generated, each having a logic value of a corresponding first signal at the time of a given transition of a corresponding one of said set N of phase related second signals;

outputting a composite fourth signal comprising any of said second signals having a first given logic value whenever a corresponding one of said third signals is of a second given logic level; and generating said set N of first signals from a set N of control elements connected in a ring configuration, with each control element receiving ones of said set N of third signals corresponding to adjacent elements in the ring where normally only one of said control elements outputs a first signal of a given logic value with the exception being a short time after a phase alteration signal is received by said set N of control elements.

3. Apparatus for digitally controlling the phase output of an oscillator comprising, in combination:

signal holding first means, including input means for receiving a set N of logic first signals and additional input means for receiving a set N of phase related second signals, for clocking the set N of logic first signals with the received set N of phase related second signals wherein a set N of third signals is generated each having a logic value of a corresponding first signal at the time of a given transition of a corresponding one of said set N of phase related second signals;

signal selection second means, connected to said first means for receiving said second and third signals therefrom, for outputting a composite fourth signal comprising any of said second signals having a first given logic value whenever a corresponding one of said third signals is of a second given logic level; and control element third means, connected between said second and first means for receiving said second and fourth signals therefrom and including phase altering signal input means, for generating said set N of first signals from a set N of control elements connected in a ring configuration, with each control element receiving ones of said set N of third signals corresponding to adjacent elements in the ring where normally only one said control elements supplies a first signal of a given logic value with the exception being a short time after a phase altering signal is received by said set N of control elements.

4. Digital oscillator apparatus comprising, in combination:

base signal supply first means for supplying a plurality of first signals all of the same base frequency and each of an incrementally different phase;

selected phase holding register second means, including select and phase input means connected to said first mean for receiving said plurality of first signals at said phase input means and further including a plurality of output mean corresponding to each of said plurality of first signals, for maintaining a logic level output second signal at each of said output mean corresponding to the logic level of said first signal at the time of receipt of a signal at a corresponding select input thereof;

selector summing third means, including activation and phase input means connected to said second and first means respectively for receiving signals therefrom and including an apparatus clock signal output for supplying clock third signals, said third means normally passing only one of said phase input first signals to the clock signal output in response to a given logic level of a received second signal at said activation input means thereof and logically ANDing two of said second signals only for a brief time after the oscillator apparatus receives a frequency increment or decrement signal;

control element fourth means, connected to said third means to receive said third signal, connected to said second means to receive said second signals and including phase altering increment and decrement inputs and a plurality of outputs for providing output fourth signals to said select inputs of said second means, said fourth means comprising a plurality of control logic elements with one corresponding to each of the received second signals; and further means within said fourth means for connecting the control logic elements in a ring configuration whereby each control element receives second signals corresponding to action taken by each of its adjacent control logic elements as well as receiving fourth signals corresponding to those output by each of its adjacent control logic elements and further connecting each of said control elements to receive phase altering increment and decrement signals and to receive said third signal, an ON control element turning to an OFF condition only upon receipt of a given logic level second signal which is confirmation that an adjacent control element has changed from an OFF to an ON condition and an OFF control element turning to an ON condition only upon receipt of a phase altering increment or decrement signal and a given logic level fourth signal indicating that the adjacent control element is in an ON condition.

* * * * *